Patented Nov. 1, 1938

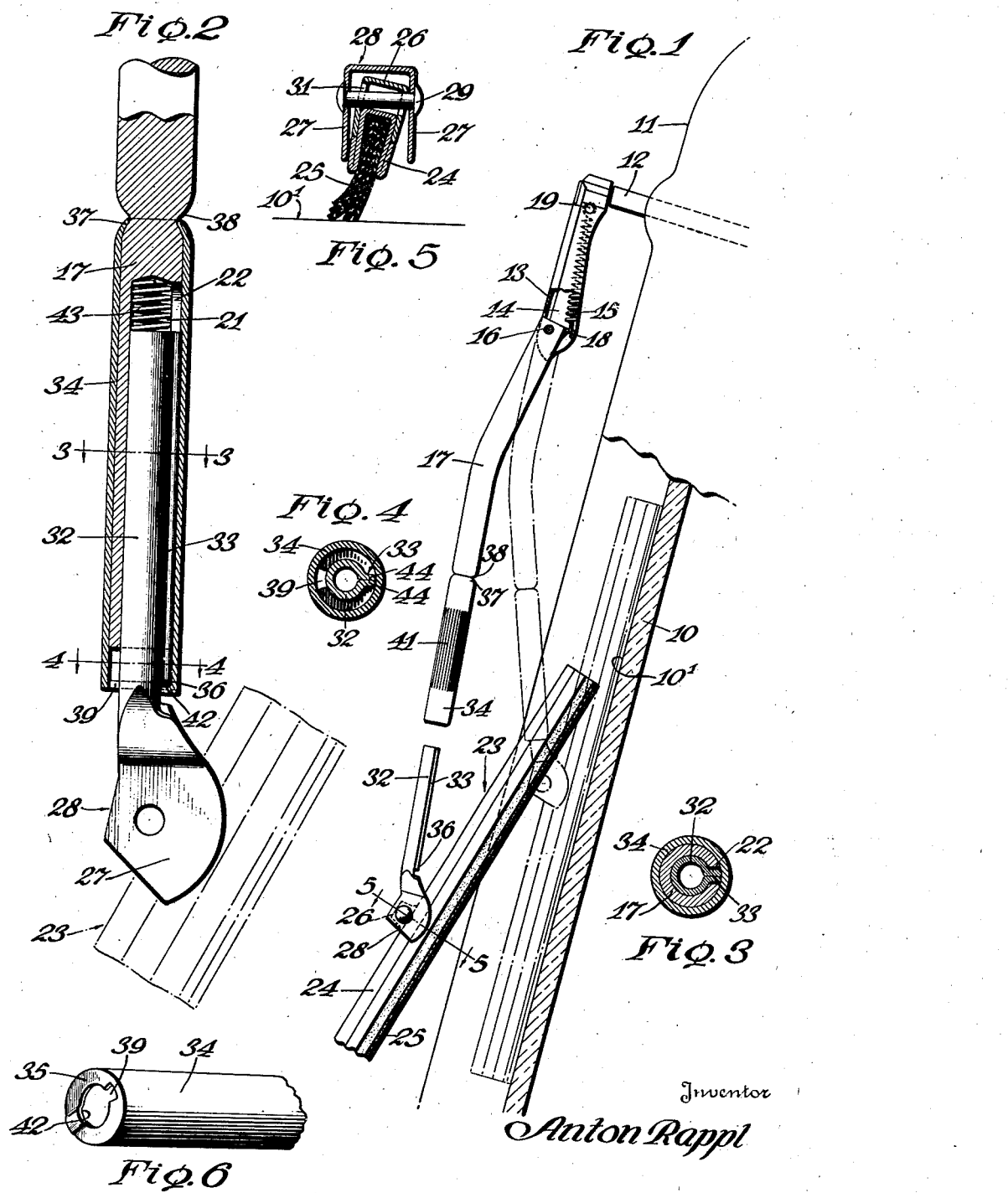

2,134,954

UNITED STATES PATENT OFFICE 2,134,954

WINDSHIELD CLEANER

Anton Rappl, Buffalo, N. Y., assignor to Trico Products Corporation, Buffalo, N. Y.

Application March 23, 1933, Serial No. 662,326

4 Claims. (Cl. 15—250)

This invention relates to windshield cleaners, and particularly to improved means for connecting a windshield wiping blade to the means which carries or actuates the blade.

Windshield wiper blades, particularly those of the type having a plurality of stepped plies of rubber wiping material are preferably inclined as they move across the surface to be wiped in order to allow the edges of several plies to simultaneously have wiping contact. In a blade which oscillates back and forth across the glass, it is desirable, therefore, to have the inclination of the blade reverse, or cause it to have a "flopping" action as each wiping stroke is commenced. In windshield cleaners heretofore used, it has been customary to detachably connect the blade to a carrying arm, which is in turn carried by the motor shaft or other supporting member. Spring means associated with the arm and actuating member are provided to press the arm and hence the blade carried thereby toward the glass. The "flopping" action has been provided by the flexible, detachable connection between the blade and arm.

However, as blades may sometimes vary slightly in dimension, and as the cooperating portion of the arm may be slightly deformed by successive removals and replacements of blades, the "flopping" action is not always uniform, but may result in inclination of the blade to a greater or lesser degree than that which will bring the blade into proper wiping relation to the glass.

For these, and other reasons, including the desirability of greater facility for effecting removal and replacement of blades, the purpose of the present invention is to provide an assembly of wiper blade and mounting means therefor, in which the blade is provided with a holder in which it may have a limited angular movement to effect the desired "flopping action"; the holder being adapted for substantially rigid securement to a carrying arm, yet being readily attachable thereto, or detachable therefrom; and the arm itself being movable, by resilient means, about an axis adjacent the actuating part of the cleaner, to urge the arm toward the windshield glass so as to press the blade into firm wiping contact therewith.

With such provisions, the blade holder, supporting the blade for correct flopping action, may be removed from or attached to the arm without necessity of disturbing the relationship between the blade and holder.

These and other objects and advantages, including those inherent in the various features of arrangement and structure, will become apparent from the following description of the typical embodiment of the invention illustrated in the accompanying drawing, wherein:

Fig. 1 is a side elevational view of the parts of the windshield cleaner which the present invention concerns, shown as mounted upon a vehicle windshield, the full lines showing parts in disassembled relation, and the broken lines illustrating the parts in assembled relation and in an operative position with respect to the windshield;

Fig. 2 is a longitudinal section through a portion of the structure shown in Fig. 1;

Figs. 3 and 4 are cross-sections taken along lines 3—3 and 4—4, respectively, of Fig. 2;

Fig. 5 is a cross-section taken along line 5—5 of Fig. 1; and

Fig. 6 is a fragmentary perspective view of a sleeve part depicted in Figs. 1 to 4, inclusive.

As illustrated in Fig. 1, a conventional motor vehicle is provided with a window or windshield glass 10 and, adjacent thereto, a frame or other supporting structure 11. Supported by the latter, either directly or indirectly, is an actuating or supporting shaft 12 which may be partially rotated or rotatable or otherwise moved or movable so that a wiper blade carried by it will be moved or be allowed movement across the glass 10 to remove rain, snow or other foreign matter therefrom.

Extended from actuating member 12 is a portion 13, preferably hollowed at its rear face 14 to provide a housing for a spring 15. Pivoted by pin 16 to part 13 is a wiper supporting arm 17, which extends in substantial parallelism with the glass 10 and has a projection 18 engaged with one end of spring 15, the other end of the spring being anchored at 19 relative to part 13 of the actuating member 12. The spring, being tensioned, will normally urge movement of arm 17 toward the glass 10, about the axis of pivot pin 16 (in a counter-clockwise direction as viewed in Fig. 1). The end of the arm 17 opposite from the pivot has a bore 21, is substantially tubular as shown in Fig. 2, and has a slot or keyway 22 formed in the wall of such tubular portion.

The wiper blade, shown at 23, comprises a channeled metal body 24 carrying a plurality of stepped plies 25 of rubber or like wiping material. Secured to the body 24, approximately medially of its ends, is a clip 26 disposed between the spaced side walls 27 of a blade holder 28. Extending across the channel of the latter, between the side walls 27 thereof, is a pin 29 which extends through an opening 31 through the clip portion 26 of the blade.

Holder 28 has a shank 32 extending into bore 21 of arm 17, the shank having a fin or key portion 33 fitting slot 22 to thereby retain the holder against rotation or angular movement relative to the arm. For retaining the holder shank in the bore, a sleeve 34 is provided about the arm 17, the sleeve having an inwardly directed flange 35 adjacent the mouth of bore 21 for abutment with the end 36 of fin or key 33. The opposite end of the sleeve 34 is contracted, as indicated at 37 in Fig. 2, to fit an annular groove 38 in the arm. Flange 35 of the sleeve has formed therein a notch 39 of sufficient area to pass the fin when aligned therewith.

The outer surface of the sleeve may be fluted, as shown at 41 in Fig. 1, or otherwise adapted for engagement by the fingers or by a tool to enable the sleeve to be readily rotated about the axis of arm 17 to align the notch 39 with slot 22, whereupon the holder shank may be readily inserted in or removed from bore 21. When the parts are in the relative positions shown in Fig. 2, that is, when the notch 39 is not aligned with slot 22, the holder shank and arm 17 are positively locked against detachment.

In order to prevent accidental rotation of sleeve 34, the inner surface of flange 35 is recessed at 42 to receive the end 36 of the key fin when the recessed portion is aligned therewith and a spring 43 is provided in bore 21 to exert pressure against the shank to press the key fin into recess 35. By reason of this construction, the sleeve may be readily rotated to align the notch 39 with slot 22 when it is desired to attach or detach the holder and blade, especially if the latter parts be moved longitudinally (upwardly as the device is viewed in Fig. 2) to release the end of the fin from recess 35, but the slot and arm normally will be positively interlocked against accidental displacement. It will be understood that the holder and blade are not necessarily moved longitudinally by a separate manual operation to relase the sleeve for rotation relative to the fin, since the shoulders of recess 42 may be sloping, or the edge 36 of the key fin may be slightly rounded, so that rotary pressure only, applied to the sleeve, will cause retraction of the holder sufficient to disengage the detent means 36, 42 and permit relative rotation of arm 17 and sleeve 34.

The holder 28, with the shank portion 32 may be formed from a single piece of metal, by forming one end to substantially U-cross-section, shown in Fig. 5 as having the spaced wall portions 27, 27, and by forming the other end to substantially tubular form, as shown in Figs. 3 and 4, the edges of 44, 44 of the tubular portions being outwardly directed to constitute the fin or key 33.

It will be understood from the foregoing description that the present invention provides a wiper blade mounting including a holder secured to the blade; a rigid arm to which the holder may be rigidly but detachably secured, the arm being movable toward the windshield about its pivot axis as a rigid unit with the holder for pressing the blade into wiping contact with a glass. The blade, while capable of detachment by removal of the holder from the arm, may be permanently secured to the holder by the manufacturer, insuring to a greater degree proper wiping action. For, as indicated in Fig. 5, the spacing of the side walls 27 of the holder 28, and the diameter of opening 31 with respect to pin 29, are such that the blade may have a "flopping" action within the holder, to enable several edges of the plies 25 to have simultaneous wiping contact with the surface 10' of glass 10.

As the blade and holder are attached and detached as a unit, as by merely inserting the holder shank in the arm bore by rotating sleeve 34, or vice versa, there is no occasion for the user to change or in any way disturb the operative relationship between the holder and blade, and hence this relationship, accurately adjusted at the time of manufacture, may remain unchanged.

It will be understood further that the device herein described is merely exemplary of the inventive principles involved, which may be embodied in other devices having different structural characteristics within the purview of this invention.

What is claimed is:

1. In a windshield cleaner, a wiper arm section having a tubular end, a holder for carrying a wiper blade, said holder having a shank extending into the tubular end of the arm section, the latter having a longitudinal recess open at the end of the arm section, the shank having a key fin engaged in the recess, a sleeve surrounding said end of the arm section and secured thereto for rotation thereabout, said sleeve having a flange closing the mouth of said recess to retain the key fin in the recess when said sleeve is rotated to align the flange with said mouth, said sleeve when rotated to displace said flange from the mouth permitting the holder to be removed from the arm section, and spring means between the arm section and holder for pressing the key fin toward said flange.

2. In a windshield cleaner, a wiper arm section having a tubular end, a holder for carrying a wiper blade, said holder having a shank extending into the tubular end of the arm section, the latter having a longitudinal recess open at the end of the arm section, the shank having a key fin engaged in the recess, a sleeve surrounding said end of the arm section and secured thereto for rotation thereabout, said sleeve having a flange closing the mouth of said recess to retain the key fin in the recess when said sleeve is rotated to align the flange with said mouth, said sleeve when rotated to displace said flange from the mouth permitting the holder to be removed from the arm section, and spring means between the arm section and holder for pressing the key fin toward said flange, and said flange being recessed to receive the end of said key fin when the latter is aligned therewith, to preclude accidental rotation of said sleeve.

3. In a windshield cleaner, a wiper blade having a connecter member and a wiper arm member, one member having a socket telescopically receiving the other member, said other member having a shoulder and said one member having a part defining a shoulder for abutment against the first mentioned shoulder to retain the members against longitudinal displacement, said part being rotatable relative to said other member to disengage the shoulders, and spring means tending to eject said other member from the socket and acting to hold the shoulders engaged when they are in abutment.

4. In a windshield cleaner, a wiper unit having a wiping blade and a permanently attached shank, actuating means for the wiper unit comprising an arm and means for urging said arm to exert wiping pressure on the wiping blade, said shank and arm having interlockable parts detachably connecting the wiper unit to the arm for operation thereby, said shank forming a continuation of the arm when so connected, and resilient means independent of said arm urging means acting on said parts to secure their interlock.

ANTON RAPPL.